(12) United States Patent
Numazaki et al.

(10) Patent No.: US 8,316,877 B2
(45) Date of Patent: Nov. 27, 2012

(54) COMPONENT HOLDING DEVICE

(75) Inventors: Kazushi Numazaki, Toyota (JP);
Takuya Suzuki, Anjo (JP); Toshikatsu Kubo, Okazaki (JP)

(73) Assignee: JTEKT Corporation, Osaka-shi (JP)

( * ) Notice: Subject to any disclaimer, the term of this patent is extended or adjusted under 35 U.S.C. 154(b) by 746 days.

(21) Appl. No.: 12/468,500

(22) Filed: May 19, 2009

(65) Prior Publication Data

US 2009/0285650 A1 Nov. 19, 2009

(30) Foreign Application Priority Data

May 19, 2008 (JP) .................................. 2008-131065

(51) Int. Cl.
*F16K 24/04* (2006.01)
*F17C 13/04* (2006.01)
(52) U.S. Cl. ........................................ 137/312; 251/144
(58) Field of Classification Search .................. 137/312, 137/613; 251/144, 143; 277/928
See application file for complete search history.

(56) References Cited

U.S. PATENT DOCUMENTS

| 4,782,861 | A | * | 11/1988 | Ross | 137/613 |
| 5,562,117 | A | * | 10/1996 | Borland et al. | 137/74 |
| 5,937,895 | A | * | 8/1999 | Le Febre et al. | 137/494 |
| 7,255,354 | B2 | * | 8/2007 | Tamura et al. | 277/928 |

FOREIGN PATENT DOCUMENTS

| JP | 6-229481 | 8/1994 |
| JP | 2007-200745 | 8/2007 |
| JP | 2008-008378 | 1/2008 |

OTHER PUBLICATIONS

Office Action (with English translation) mailed on Sep. 4, 2012, in counterpart Japanese Appln No. 2008-131065 (5 pages).

* cited by examiner

*Primary Examiner* — Kevin Lee
(74) *Attorney, Agent, or Firm* — Oblon, Spivak, McClelland, Maier & Neustadt, L.L.P.

(57) ABSTRACT

A component holding device includes: a fixing member that has a first inner wall surface that forms a first hole into which gas can be entered and a component can be inserted; a component holding section that is fit to the first hole of the fixing member and that holds the component; a sealing section that is provided in the first hole and that seals the component holding section to prevent water from entering into the first hole of the fixing member; and a vent path that is provided in at least one of the fixing member and the component holding section so as to communicate with a gas residual section in the component insertion hole and that discharges leaked gas in the gas residual section to outside air.

17 Claims, 7 Drawing Sheets

COMPONENT HOLDING DEVICE

INCORPORATION BY REFERENCE

The disclosure of Japanese Patent Application No. 2008-131065 filed on May 19, 2008 including the specification, drawings and abstract is incorporated herein by reference in its entirety.

BACKGROUND OF THE INVENTION

1. Field of the Invention

The present invention relates to a component holding device that includes a hole into which gas such as hydrogen gas is allowed to enter and in which components such as a wire and a temperature sensor are inserted and held.

2. Description of the Related Art

The following description is based on an example of a wire holding device that is used in a fuel cell system. A wire holding device includes: a fixing member that has an inner wall surface provided with a wire insertion hole through which a wire is inserted; and a wire holding section that holds the wire that is electrically connected to an electrical apparatus fit to the wire insertion hole of the fixing member. The wire holding device of this type is provided with a waterproof sealing section that seals the wire holding section in order to prevent water from entering into the wire insertion hole.

In addition, Japanese Patent Application Publication No. 6-229481, which is not related to a fuel cell system, discloses a control valve that prevents the entry of moisture and dust while maintaining a housing chamber that houses a control spring at atmospheric pressure at all times. In the control valve of this type, a fixing part that has the housing chamber to house the control spring is provided with a filter plate made of a water repellent material. The inside of the housing chamber is maintained at atmospheric pressure at all times by communicating the housing chamber with the outside air via a through hole provided in the filter plate.

In the wire holding device that is used in the fuel cell system described above, leaked anode gas sometimes remain in a gas residual section that is positioned between the inner wall surface that is provided with the wire insertion hole and the wire holding section. Anode gas includes hydrogen as an active material. For this reason, it is not preferable that anode gas remains in the gas residual section in the wire insertion hole.

SUMMARY OF THE INVENTION

An object of the present invention is to provide a component holding device that discharges leaked gas such as hydrogen gas to the outside air and that effectively prevents the gas from remaining in the component holding device.

The component holding device according to one aspect of the present invention includes: (i) a fixing member that includes a first inner wall surface that forms a first hole into which gas is able to be entered and a component is able to be inserted; (ii) a component holding section that is fit to the first hole of the fixing member and used to hold the component; (iii) a sealing section that is disposed in the first hole and seals the component holding section to prevent water from entering into the first hole of the fixing member; and (iv) a vent path that is provided in at least one of the fixing member and the holding section so as to communicate with a gas residual section and that is used to discharge leaked gas in the gas residual section to the outside air.

The fixing member includes a first inner wall surface that forms a first hole into which a component is inserted. Gas can be entered into the first hole. The component holding section is fit to the first hole of the fixing member, and thus holds a component. A component may be a wire or a sensor, for example. The sensor may be a temperature sensor or a pressure sensor.

The sealing section is disposed in the first hole of the fixing member, and seals the component holding section in order to prevent water from entering into the first hole. As described above, since the component holding section is sealed by the sealing section, discharge of leaked gas to the outside air is limited by the scaling section. Accordingly, the leaked gas may remain in a space in the first hole. This space is called a gas residual section. That is, the gas residual section is the space in which the leaked gas remains, and is positioned in the first hole.

The vent path directly or indirectly communicates the gas residual section in the first hole with the outside air. The direct communication indicates that the communication between the gas residual section and the outside air is not intervened by another path. The indirect communication indicates that the communication between the gas residual section and the outside air is intervened by another path. Accordingly, the leaked gas in the gas residual section can be discharged to the outside air through the vent path. A position where the vent path is formed is not limited. The vent path may be formed anywhere as long as it allows discharge of gas to the outside air. That is, it does not matter whether the vent path is formed in the fixing member or in the component holding section. According to the component holding device of the present invention, since the leaked gas can be discharged to the outside air through the vent path, the gas is effectively prevented from remaining in the gas residual section. Therefore, the component holding device of the present invention is suitable when the gas is flammable or corrosive.

In the above aspect, the vent path may be provided with a resistance member with a gas transmission ability that inhibits water transmission but permits gas transmission. In this case, the discharging ability to discharge gas to the outside air is maintained while the entry of the water such as rainwater is prevented. The resistance member may be water repellent. Accordingly, the resistance member may be formed as a water repellent member that includes a water repellent material such as fluorocarbon resin and fluorine-contained rubber. The resistance member may be disposed in a supply port of the vent path that is close to the atmosphere, may be disposed in an outlet port, or may be disposed in an intermediate position between the supply port and the outlet port.

In the above aspect, a protective cover that protects the resistance member may be disposed in at least one of the component holding section and the fixing member. Accordingly, protection of the resistance member can be enhanced. The protective cover may be integrated with the component holding section or the fixing member, or may be a separate unit. Also, a protective cover that covers the fixing member may be provided. In this case, since the fixing member is covered by the protective cover, protective performance of the resistance member can also be enhanced. The protective cover may be an integrated unit with the component holding section or the fixing member, or may be a separate unit.

In the above aspect, the fixing member may include an internal thread hole into which an external thread is screwed, and the vent path may communicate with the internal thread hole. In this case, the gas discharged from the vent path can be discharged through a thread clearance between the internal thread and the external thread in the internal thread hole.

When the external thread is screwed into the internal thread hole, the internal thread hole is closed by the external thread. Thus, foreign matters are prevented from entering into the vent path. A "foreign matter" is used here as a concept that includes water.

In the above aspect, the fixing member may includes an internal thread hole, and the component holding section may be fixed to the fixing member by screwing a tightening bolt into the internal thread hole. The vent path may be communicated with the internal thread hole. In this case, when the external thread is screwed into the internal thread hole, a foreign matter is prevented from entering into the vent path.

In the above aspect, the component holding section may include: a first component holding section that is fit to the first hole and holds a component electrically connected to an electrical apparatus; and a second component holding section that is fit to the first hole and holds a component. The component held by the first component holding section and the component held by the second component holding section may be the same or different.

In the above aspect, the fixing member may be mounted to a tank in which gas is stored in a high pressure state. Examples of gas include: anode gas that is supplied to an anode of a fuel cell in a fuel cell system; cathode gas that is supplied to a cathode of the fuel cell; carbon-hydrogen gas that has not been reformed by a reformer; nitrogen gas that purges the fuel cell and the like; and purge gas such as inactive gas. Purge gas is enclosed in the fuel cell or the reformer when the fuel cell system is not operated. Since hydrogen gas has a small molecule size and low viscosity, it tends to leak into and remain in the gas residual section.

In the above aspect, a component may be a wire. Accordingly, in this case, the component holding device is the same as the wire holding device. The wire holding device includes: a fixing member that has a first inner wall surface that forms a first hole into which gas is able to be entered and a wire is able to be inserted; a wire holding section that is fit to the first hole of the fixing member and that holds the wire; a sealing section that is provided in the first hole and that seals the wire holding section to prevent water from entering into the first hole; and a vent path that is provided in at least one of the fixing member and the wire holding section so as to communicate with the gas residual section positioned in the first hole and that discharges leaked gas in the gas residual section to the outside air.

According to the aspect of the present invention, it is possible to provide a component holding device that effectively prevents gas leaked in the gas residual section in the first hole of the fixing member from remaining in the gas residual section. The component holding device is especially suitable when the gas is flammable or corrosive.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

DETAILED DESCRIPTION OF EMBODIMENTS (First Embodiment) A first embodiment of the present invention will be described with reference to FIG. 1 to FIG. 6. The first embodiment is applied to a fuel cell system used in a vehicle, electrical apparatus, electronic apparatus, stationary equipment, transportable equipment, etc. Overall configuration is described first. As shown in FIG. 1 and FIG. 2, a fluid supply valve assembly device has a fixing member 1 and a fluid supply valve 4 (electrical apparatus) that is removably mounted to the fixing member 1. Overall configuration is described first.

As shown in FIG. 1, the fixing member 1 is mounted to a mounting hole 32 in a tank wall 31 with an inner surface 31c that forms a tank chamber 30 (fluid tank chamber, source of intruding gas) of a tank 3 that stores gas (hydrogen gas) at high pressure. High pressure gas (hydrogen gas) is stored in the tank chamber 30. The pressure in the tank chamber 30 is higher than atmospheric pressure and generally maintained within a range of 10 to 250 MPa, 20 to 150 Mpa, or 40 to 100 MPa. However, the pressure in the tank chamber 30 is not limited to the above ranges.

Figure 1:
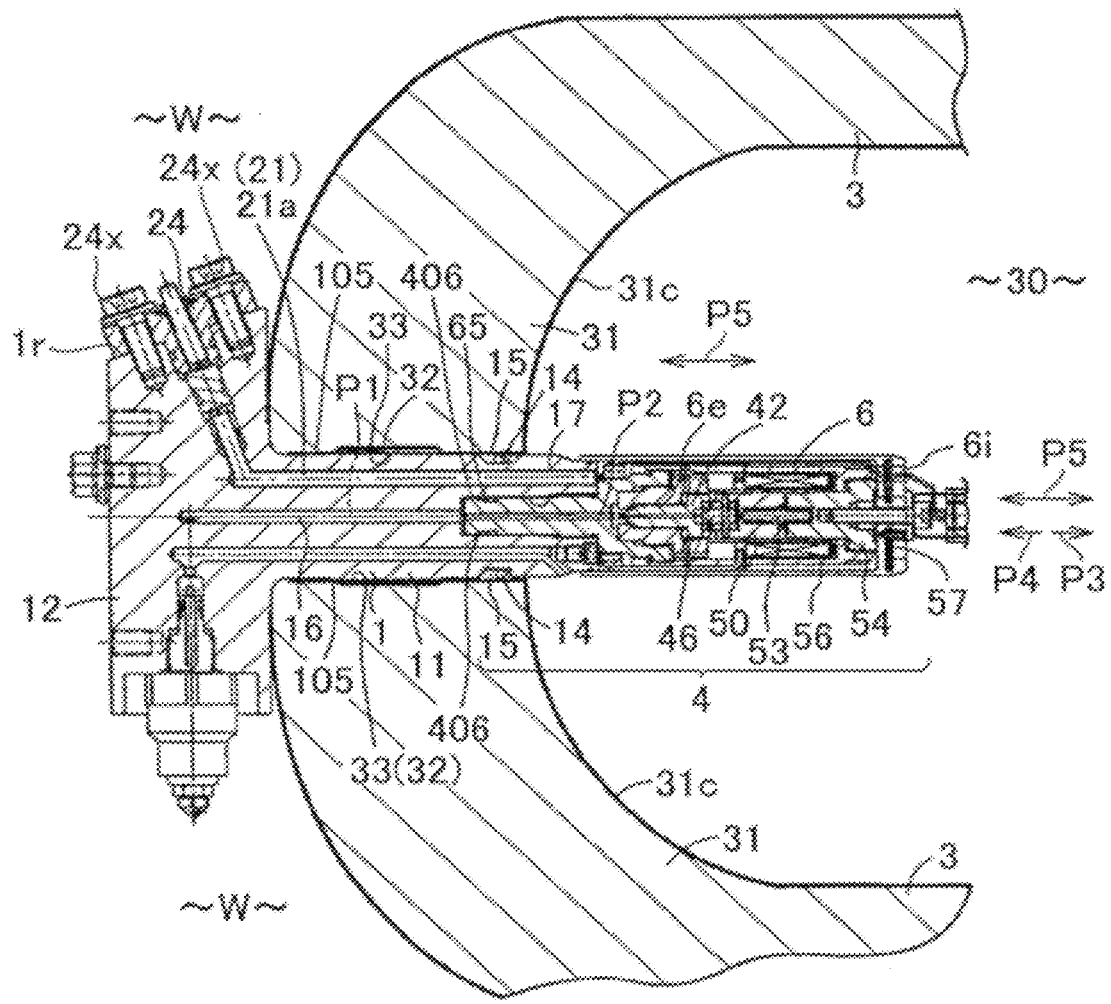
FIG. 1 is a sectional view of a state where a fluid supply valve is mounted to a fixing member of a tank that stores high pressure gas according to a first embodiment.

The fixing member 1 fixes the fluid supply valve 4 to the tank 3 and has; a shaft-shaped first portion 11 that is mounted in the mounting hole 32 of the tank wall 31; and a flange-shaped second portion 12 that is disposed next to the first portion 11 so as to face outside air W on the outside of the tank 3.

As shown in FIG. 1, a ring-shaped first sealing member 14 formed by a sealing material is disposed between a first outer peripheral wall surface 105 of the first portion 11 of the fixing member 1 and a first inner peripheral surface 33 of the mounting hole 32 in the tank wall 31. The first sealing member 14 is arranged in a ring-shaped first seal groove 15 that is coaxially formed in the outer periphery of the first portion 11 of the fixing member 1, and seals the boarder between the first outer peripheral wall surface 105 of the fixing member 1 and the first inner peripheral surface 33 of the mounting hole 32 of the tank 3 in an airtight manner.

As shown in FIG. 1, a first passage 16 is formed in the center of the first portion 11 of the fixing member 1 in an axial direction. A gaseous (hydrogen gas) fluid is passed through the first passage 16 and is supplied to a stack side of fuel cells. A pressure reduction valve (not shown) is provided between an outlet port side of the first passage 16 of the fixing member 1 and an anode (fuel electrode) of the stack of the fuel cells.

Figure 2:
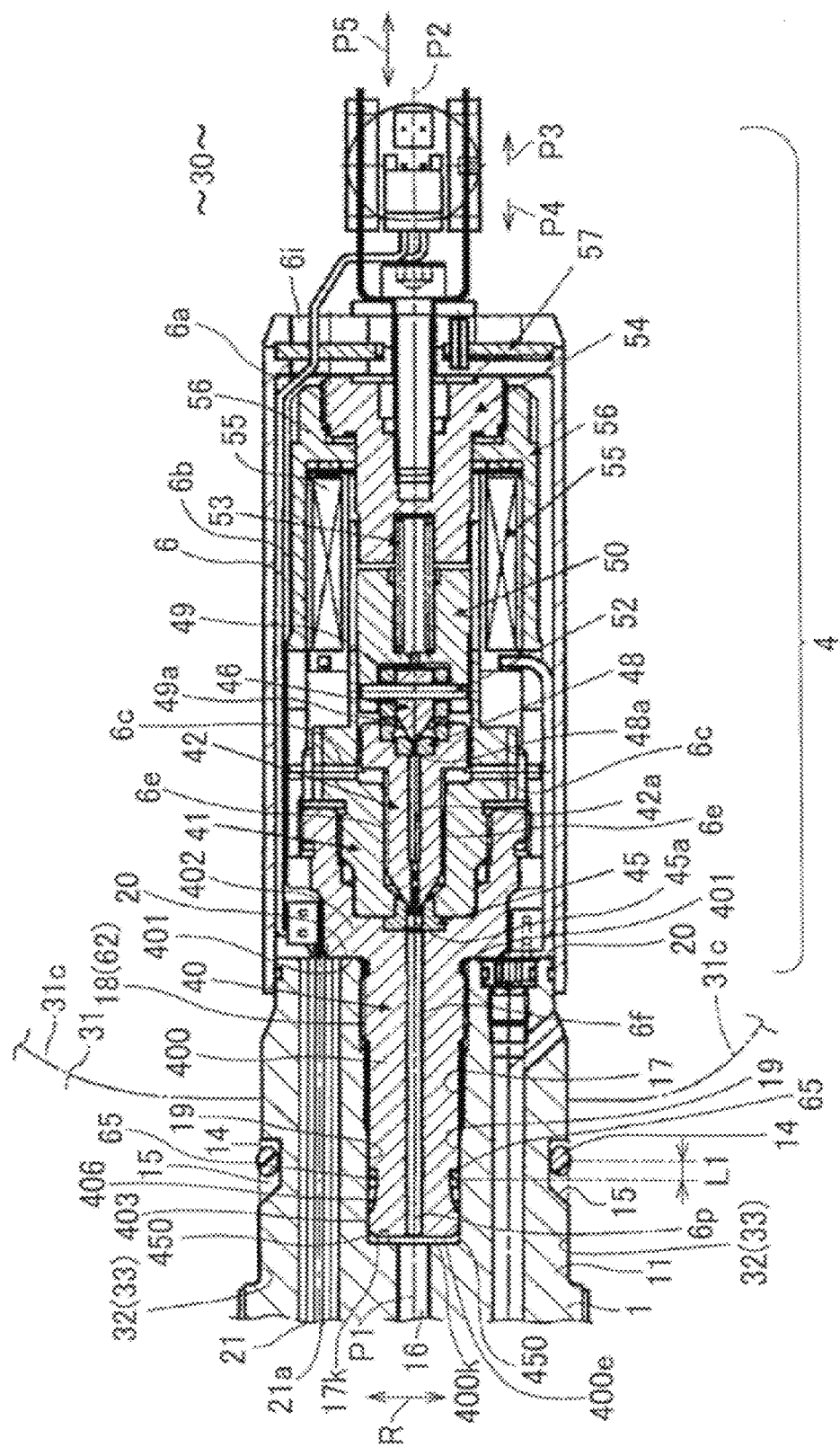
FIG. 2 is a partial sectional view of the state where the fluid supply valve is mounted to the fixing member of the tank that stores high pressure gas in an enlarged manner.

As shown in FIG. 2, the fixing member 1 has a concave fitting section 17 in the shape of a recessed cylinder. The concave fitting section 17 is coaxially formed in the first portion 11 of the fixing member 1 and opens toward the tank chamber 30. The inner periphery of the concave fitting section 17 has: an internal thread 18; and a cylindrical second inner peripheral surface 19 that is formed at the back of the internal thread 18 in the axial direction of the fixing member 1 (in the direction away from the tank chamber 30 in the tank 3), in other words, extended along an axis P1. In the concave fitting section 17, the second inner peripheral surface 19 and the internal thread 18 are coaxially arranged with respect to the axis P1 of the fixing member 1.

As shown in FIG. 2, the fixing member 1 is provided with a ring-shaped stopper surface 20 that extends in the radial direction of the fixing member 1 (the arrow R direction). The stopper surface 20 is positioned at an end portion facing the tank chamber 30. The fixing member 1 is further provided with a first hole 21 through which a wire 21a (component) is inserted.

As shown in FIG. 2, the fuel supply valve 4 is a solenoid valve that includes: a cylindrically-shaped convex insertion section 40 that is inserted in and removably fit to the concave fitting section 17 of the fixing member 1; a tubular plug 41 that is partially fit to the convex insertion section 40; a main poppet 42 that is partially fit to the plug 41 and functions as a tubular valve body with a pilot passage 42a; a main seat 45 in which a tip of the main poppet 42 can be seated and which has a main port 45a; a tubular pilot poppet 46; a pilot seat 48 in which a tip of the pilot poppet 46 can be seated and which has a pilot port 48a; a sub plug 49 that has a through hole 49a communicating in the radial direction; a tubular plunger 50; a pin 52 that connects the plunger 50, the pilot poppet 46, and the sub plug 49; a coil-shaped spring 53 that urges the plunger 50 in the direction to close the valve (in the arrow P4 direction); a tubular stopper 54; a tubular excitation coil 55 that is arranged on the outer peripheral side of the stopper 54 and the plunger 50; a yoke 56 that forms a magnetic path when the excitation coil 55 is excited; and a filter 57 for dust removal that faces the tank chamber 30.

As shown in FIG. 2, the convex insertion section 40 of the fluid supply valve 4 has an axis P2 that is coaxial with the axis P1 of the fixing member 1. When the excitation coil 55 is not energized, the plunger 50 is biased in the direction to close the valve (the arrow P4 direction) by urging force of the spring 53, and then the pilot poppet 46 is biased in the direction to close the valve (the arrow P4 direction) via the pin 52 to close the pilot port 48a of the pilot; seat 48. Furthermore, the main poppet 42 is biased in the direction to close the valve (the arrow P4 direction) to close the main port 45a of the main seat 45.

As shown in FIG. 2, a second passage 6 is formed in the fuel supply valve 4 to guide the gas in the tank chamber 30 of the tank 3 to the first passage 16. An outlet port 6p, which is one end of the second passage 6, is coaxially formed in the convex insertion section 40 and can be communicated with the first passage 16 of the fixing member 1. A supply port 6i, which is the other end of the second passage 6, faces the tank chamber 30 of the tank 3 as a fluid storage source, Specifically, the second passage 6 includes: a passage 6a that is provided in the tank chamber 30 of the tank 3 via the supply port 6i; a passage 6b that is provided on the outer peripheral side of the yoke 56; a passage 6c that is provided in the plug 41 and that commu-nicates in the radial direction of the plug 41; a passage 6e that is formed on the outer periphery of the main poppet 42; a main port 45a that is formed in the main seat 45; and a passage 6f that is formed in the center of the convex insertion section 40.

In this embodiment, the fuel supply valve 4 is opened in the following procedure. First, the excitation coil 55 is energized for excitation, so that the magnetic path that passes through the yoke 56 is formed. Then, the plunger 50 moves in the direction to open the valve (the arrow P3 direction) against the urging force of the spring 53. Then, the pilot poppet 46 moves in the direction to open the valve (the arrow P3 direction) via the pin 52, and then the pilot port 48a of the pilot seat 48 is released from a closed state. Then, the high pressure gas in the tank chamber 30 flows through the supply port 6i, the passage 6b, the passage 49a of the sub plug 49, the pilot port 48a, the pilot passage 42a of the main poppet 42, and the main port 45a of the main seat 45 to the first passage 16 of the fixing member 1. Then, the difference between the pressure that urges the main poppet 42 in the direction to close the valve (the arrow P4 direction) and the pressure that urges the main poppet 42 in the direction to open the valve (the arrow P3 direction) is reduced. Accordingly, the main poppet 42 moves in the direction to open the valve (the arrow P3 direction), causing to release the main port 45a of the main seat 45 from a closed state. Accordingly, the high pressure gas in the tank chamber 30 flows through the passages 6b, 6c, and 6e and the main port 45a of the main seat 45 into the passage 6f in the convex insertion section 40, and flows into the second passage 16 in the fixing member 1, and then flows through the pressure reduction valve (not shown) to the anode (fuel electrode) side of the stack of the fuel cells. In order to close the fuel supply valve 4, it is only needed to shut off a power supply to the excitation coil 55.

Figure 3:
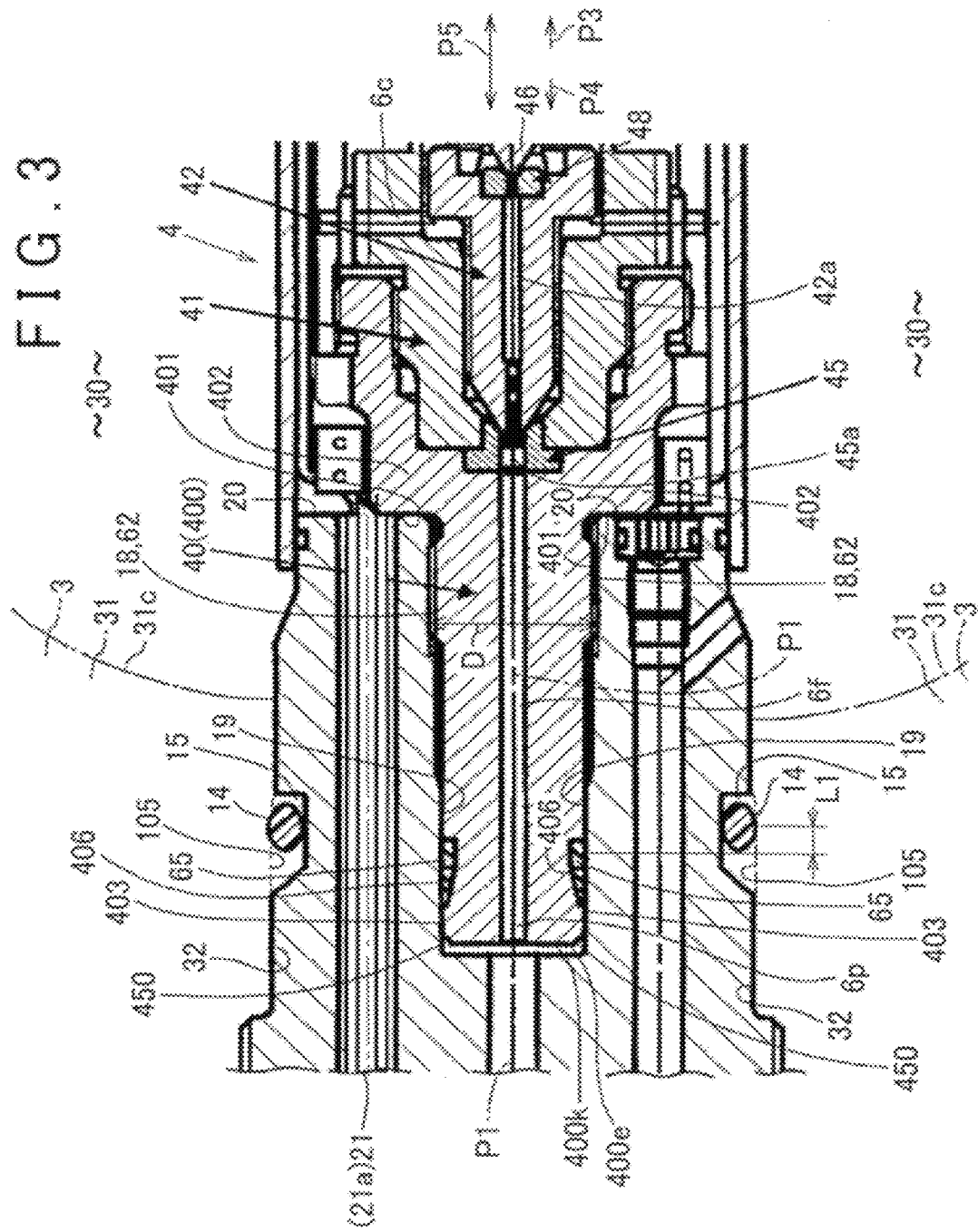
FIG. 3 is a partial sectional view of the state where the fluid supply valve is mounted to the fixing member of the tank that stores high pressure gas in a further enlarged manner.

As shown in FIG. 2 and FIG. 3, the convex insertion section 40 of the fluid supply valve 4 coaxially includes: a cylindrical shaft 400 that has, on its outer periphery, an external thread 62 that is screwed into the internal thread 18 of the concave fitting section 17; a flange 402 that is connected to one end of the shaft 400 on the tank chamber 30 side, that is radially extended, and that has a ring-shaped abutment surface 401; a taper 450 that is formed on the other end of the shaft 400 that is away from the tank chamber 30.

As shown in FIG. 2 and FIG. 3, the shaft 400 coaxially includes: the external thread 62 that is screwed into the internal thread 18; and a second outer peripheral surface 403 in the shape of a cylinder that is formed at the back of the external thread 62 in the axial direction, that is, on the side away from the tank chamber 30. The second outer peripheral surface 403 is in the shape of a cylinder and formed between the taper 450 and the external thread 62 in the extending direction P5.

When the external thread 62 is screwed into the internal thread 18, the convex insertion section 40 moves in the direction away from the tank chamber 30 (the arrow P4 direction). Consequently, the abutment surface 401 of the flange 402 of the convex insertion section 40 abuts on the stopper surface 20 of the fixing member 1. Accordingly, the convex insertion section 40 is positioned in the extending direction P5.

According to this embodiment, the clearance that is formed between the internal thread 18 of the concave fitting section 17 and the external thread 62 of the convex insertion section 40 is set to be the maximum or nearly maximum value within a range of allowable clearance widths defined in Japan Industrial Standards (JIS).

Figure 4:
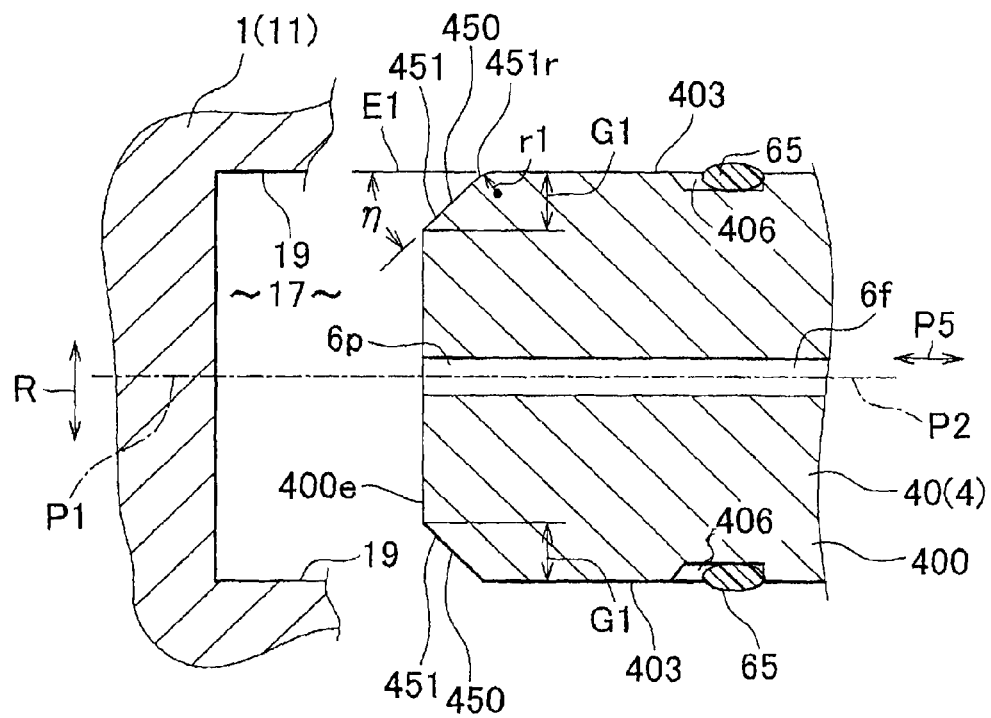
FIG. 4 is a sectional view of a state immediately before a convex insertion section of the fluid supply valve is fit to a concave fitting section.

FIG. 4 shows the vicinity of the taper 450. As shown in FIG. 4, the taper 450 has an inclined surface 451 that circles around the axis P2. The inclined surface 451 has a conical surface whose outside diameter becomes smaller as it approaches an end surface 400e on the end of the shaft 400 that is away from the tank chamber 30. The taper 450 is formed by chamfering the peripheral edge at the end of the convex insertion section 40.

Next, a description will be made on mounting of the fluid supply valve 4 to the fixing member 1 that is mounted to the tank 3. In this case, the fluid supply valve 4 is disposed on the tank chamber 30 side in a manner that the axis P1 and the axis P2 are nearly coaxially aligned. Then, the convex insertion section 40 of the fluid supply valve 4 is brought to face the concave fitting section 17 of the fixing member 1. In this state, the fuel supply valve 4 is rotated together with the convex insertion section 40 about the axis P1 relative to the concave fitting section 17 of the fixing member 1. This allows the external thread 62 of the convex insertion section 40 of the fuel supply valve 4 to be screwed into the internal thread 18 of the concave fitting section 17 in the fixing member 1. When the abutment surface 401 of the flange 402 of the convex insertion section 40 abuts on the stopper surface 20 of the fixing member 1, the positioning of the convex insertion section 40 of the fluid supply valve 4 in the extending direction P5 is completed. At this time, as shown in FIG. 2 and FIG. 3, clearance 400k is formed between the end surface 400e of the convex insertion section 40 and a bottom surface of the concave fitting section 17.

As described above, the convex insertion section 40 of the fluid supply valve 4 is removably fit to the concave fitting section 17 of the fixing member 1. For mounting in such a manner, the inclined surface 451 of the taper 450 provides a guiding function in the radial direction (the arrow R direction). Then, the second outer peripheral surface 403 of the guided shaft 400 in the convex insertion section 40 abuts on or approaches the second inner peripheral surface 19 of the concave fitting section 17. Accordingly, the position of the convex insertion section 40 of the fluid supply valve 4 in the radial direction (the arrow R direction) is restrained (the first restraint state).

When the external thread 62 of the convex insertion section 40 is screwed into the internal thread 18 of the concave fitting section 17, the position of the convex insertion section 40 in the radial direction (the arrow R direction) is restrained (the second restraint state).

When the second restraint state is prioritized over the first restraint state, the external thread 62 of the convex insertion section 40 is screwed into the internal thread 18 of the concave fitting section 17. However, since the second outer peripheral surface 403 of the shaft 400 of the convex insertion section 40 forcibly abuts on the second inner peripheral surface 19 of the concave fitting section 17, "scoring" may occur between the second outer peripheral surface 403 and the second inner peripheral surface 19. Especially, the concave fitting section 17 and the convex insertion section 40 are made of metal (metal with resistance to hydrogen brittleness) such as aluminum alloy and stainless steel (SUS304 and SUS316, for example), and thus are relatively soft. Therefore, the above-mentioned "scoring" may be caused.

Regarding the above matter, as described above, the first restraint state is prioritized over the second restraint state in this embodiment. In other words, the radial position (in the arrow R direction) of the convex insertion section 40 is preferentially restrained by abutting the second outer peripheral surface 403 of the shaft 400 of the convex insertion section 40 on the second inner peripheral surface 19 of the concave fitting section 17. Accordingly, "scoring" between the second outer peripheral surface 403 of the shaft 400 and the second inner peripheral surface 19 of the concave fitting section 17 can effectively be restrained. Consequently, "fixation by scoring" can effectively be prevented. Especially, even when the shaft 400 and the concave fitting section 17 are made of relatively soft metal such as aluminum alloy or stainless steel, "scoring" and further "fixation by scoring" can effectively be prevented.

Figure 5:
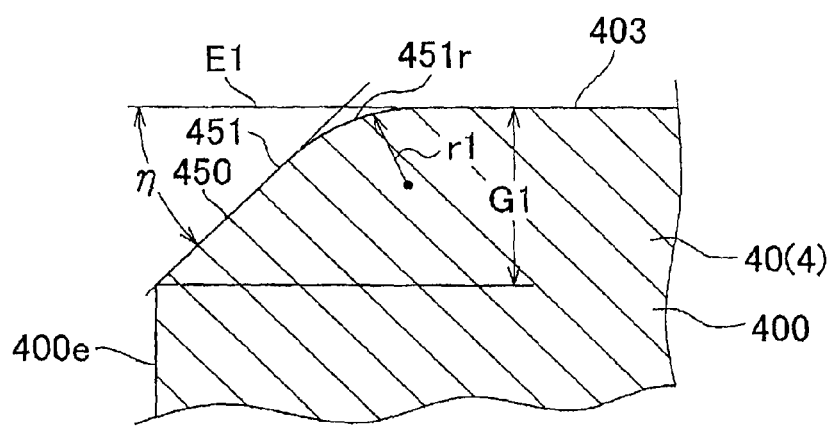
FIG. 5 is a sectional view around a taper of the convex insertion section of the fluid supply valve in an enlarged manner.

Next, the guiding function based on the conical taper 450 will be described with reference to FIG. 4 and FIG. 5. FIG. 4 and FIG. 5 show the sectional view along the axis P2 of the convex insertion section 40. In order to enhance the guiding function of the taper 450 in the radial direction, it is preferable that a difference between the maximum diameter and the minimum diameter on the inclined surface 451 of the taper 450 be large. For the above reason, in this embodiment, as shown in FIG. 4 and FIG. 5, an angle between the inclined surface 451 of the taper 450 and an imaginary line E1 that is parallel with the axis P2 of the convex insertion section 40 is set as a chamfer angle η. In this case, the chamfer angle η is set equal to or larger than 40°, or set to be large within a range of 45' to 70°, specifically, within a range of 55° to 70°. Consequently, it is possible to enlarge the difference between the maximum diameter and the minimum diameter on the inclined surface 451 of the taper 450. A guiding width G1 on the inclined surface 451 of the taper 450 can be increased while the guiding function of the taper 450 in the radial direction (arrow R direction) can be enhanced. Therefore, the external thread 62 can favorably be screwed into the internal thread 18. According to the related art, the chamfer angle η is 30° at most.

In order to prevent a mechanical damage on the convex insertion section 40 and the concave fitting section 17 upon insertion of the convex insertion section 40 into the concave fitting section 17, it is preferable that the second outer peripheral surface 403 of the convex insertion section 40 gently contact the second inner peripheral surface 19 of the concave fitting section 17 in the radial direction (arrow R direction). In this embodiment, as shown in FIG. 4 and FIG. 5, a portion of the taper 450 that has the largest outside diameter is set as a rounded surface 451r in the shape of a convex arc with a curvature radius r1. Consequently, when the convex insertion section 40 of the fluid supply valve 4 relatively approaches a depth of the cancave fitting section 17 of the fixing member 1, the impact of the abutment in the radial direction (arrow R direction) can be reduced as much as possible. In other words, the taper 450 is advantageous to make gentle contact of the second outer peripheral surface 403 of the convex insertion section 40 with the second inner peripheral surface 19 of the concave fitting section 17 and to restrain the convex insertion section in the radial direction. Furthermore, the taper 450 is advantageous to secure the sealing property of the second sealing member 65 with the reduced clearance al and to prevent a mechanical damage on the second outer peripheral surface 403 and the second inner peripheral surface 19.

As shown in FIG. 3, a second seal groove 406 in the shape of a ring is coaxially formed in the second outer peripheral surface 403. The ring-shaped second sealing member 65 made of a sealing material is disposed in the second seal groove 406. In a state where the second sealing member 65 is sealing, the second sealing member 65 enhances its sealing property by elastic deformation. As shown in FIG. 1, the first sealing member 14 is disposed between the first outer peripheral wall surface 105 of the fixing member 1 and the first inner peripheral surface 33 of the mounting hole 32 of the tank 3. In the extending direction P5 in which the axis P2 of the convex insertion section 40 extends, the first sealing member 14 is disposed in a position closer to the tank chamber 30 than a position of the outside air W outside the tank 3. Furthermore, as shown in FIG. 2 and FIG. 3, the second sealing member 65 is positioned close to the first sealing member 14 in the extending direction P5. Here, a distance between the center of the first sealing member 14 and the center of the second sealing member 65 is indicated as L1 (see FIG. 2 and FIG. 3). L1 is set smaller than the maximum bore diameter D of the concave fitting section 17. Therefore, in this embodiment, the distance from the abutment surface 401 of the flange 402 to the end surface 400e of the taper 450 can be shortened as much as possible in the extending direction P5. This is advantageous for improvement of mounting accuracy of the fluid supply valve 4.

In this embodiment, as shown in FIG. 2 and FIG. 3, the first sealing member 14 is arranged close to the second sealing member 65 in the extending direction P5. Here, a distance between the center of the first sealing member 14 and the center of the second sealing member 65 is indicated as L1 (see FIG. 2). Specifically, when the maximum bore diameter of the concave fitting section 17 is set as D [millimeter], L1 [millimeter] is set 2.5×D or lower in the extending direction P5 in which the axis P1 of the concave fitting section 17 is extended. Specifically, L1 is set to be equal to or lower than 1.0×D or lower, or is set to be equal to or lower than 0.5×D or lower.

Figure 6:
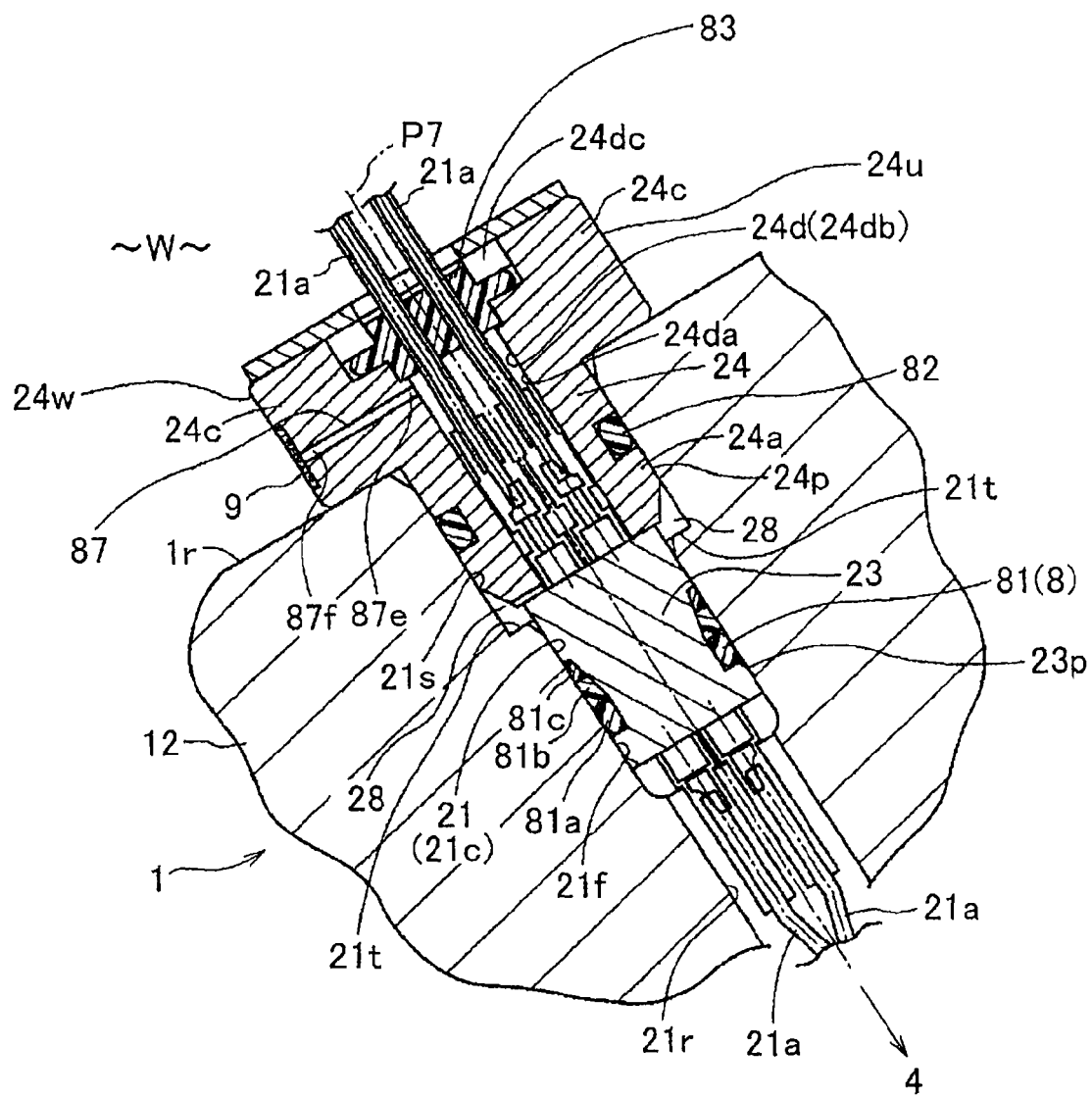
FIG. 6 is a sectional view of the state where a wire holding section is arranged with a wire in a first hole of the fixing member.

(Substantial part configuration) Here, description is made of the substantial part configuration of this embodiment. As shown in FIG. 6, the second portion 12 of the fixing member 1 is arranged to contact the outside air W, and has a first inner wall surface 21c that forms the first hole 21 in which the wire 21a (component) is inserted. The wire 21a is electrically connected to the components that are installed in the fluid supply valve 4, and transmits a valve opening command and a valve closing command to the fluid supply valve 4 (electrical apparatus). As shown in FIG. 6, the first hole 21 includes: a first insertion hole 21f; a second insertion hole 21s; a ring-shaped shoulder 21t that is a boarder between the first insertion hole 21f and the second insertion hole 21s; and a third insertion hole 21r that is formed in front of the first insertion hole 21f. The insertion hole 21f, the insertion hole 21s, and the insertion hole 21r are cylindrical and coaxially support each other. The bore diameter of the second insertion hole 21s is larger than the bore diameter of the first insertion hole 21f. The bore diameter of the third insertion hole 21r is smaller than the bore diameter of the first insertion hole 21f. The wire holding section is fit to the first hole 21 of the fixing member 1. The wire holding section includes: a hermetic sealing section 23 (first wire holding section, first component holding section) that holds a plurality of wires 21a; and a plug 24 (second wire holding section, second component holding section) that is fit to the first hole 21 of the fixing member 1 and that holds the plurality of wires 21a The hermetic sealing section 23 is a sealing member that seals the periphery of the wire 21a with a sealing material (glass, metal, carbon, etc.). The plug 24 functions as a lid that shuts off the first hole 21 from the outside air W, and includes: a cylindrical shaft 24a that is fit to the second insertion hole 21s; a flange 24c that faces and contacts an end surface 1r, which is in contact with the outside air W, in the fixing member 1; and a second hole 24d. The second hole 24d is passed through along an axis P7 of the plug 24, and includes a small hole 24da and a big hole 24dc that are formed to coaxially communicate with each other.

As shown in FIG. 1, the plug 24 is fastened and fixed to the end surface 1r of the second portion 12 of the fixing member 1 with a fastening bolt 24x (fastening member). In FIG. 6, the fastening bolt 24x is not shown. The plug 24 is, for example, made of rigid resin or metal such as aluminum alloy and stainless steel.

As shown in FIG. 6, a sealing section 8 is disposed in order to prevent the water from the outside air W from entering into the first hole 21. The sealing section 8 includes: a ring-shaped first sealing section 81 formed with a sealing material that seals an outer peripheral wall surface 23p (outer wall surface) of the hermetic sealing section 23; a ring-shaped second sealing section 82 formed with a sealing material that seals an outer peripheral wall surface 24p (outer wall surface) of the shaft 24a of the plug 24; and a disc-shaped third sealing section 83 formed with a sealing material that seals the second hole 24d of the shaft 24a of the plug 24. The first sealing section 81 includes a sealing section 81a, a sealing section 81b, and a sealing section 81c in the shape of a ring that are arranged in series to enhance a sealing property. The third sealing section 83 closes the big hole 24dc of the plug 24 while allowing the insertion of the wire 21a to enhance a waterproof property.

As shown in FIG. 6, a gas residual section 28 is necessarily formed in the space enclosed by the first sealing section 81, the second sealing section 82, and the third sealing section 83 between the first inner wall surface 21c that forms the first hole 21, the outer peripheral wall surface 23p (outer wall surface) of the hermetic sealing section 23, and the outer peripheral wall surface 24p (outer wall surface) of the plug 24. That is, the gas leaked from the first sealing section 81 remains in the gas residual section 28 that is positioned between the second sealing section 82, the third sealing section 83, and the tank chamber 30 as a source of an intruding gas. The second sealing section 82 seals between the first inner wall surface 21c and the outer peripheral wall surface 24p of the plug 24. The third sealing section 83 seals an end portion of the second hole 24d of the plug 24. The tank chamber 30 functions as a gas entry source. The gas residual section 28 is in the shape of a ring that circles around an axis P7 of the plug 24, arranged to face the shoulder 21t, and communicated with the second hole 24d of the plug 24.

As described above, when this device is used, a large amount of high pressure gas (hydrogen gas) is stored in the tank chamber 30. For this reason, gas may leak through the fluid supply valve 4, and may remain in the gas residual section 28 in the wire insertion hole 21 and further in the second hole 24d of the plug 24 that is communicated with the gas residual section 28. Especially, if the gas stored in the tank chamber 30 is hydrogen gas, because of its small molecule size and low viscosity compared to other gases, the hydrogen gas may remain in the gas residual section 28 through the fluid supply valve 4 regardless of whether the fluid supply valve 4 is opened or closed. Furthermore, the hydrogen gas may remain in the second hole 24d of the plug 24. Since the hydrogen gas is flammable, the least amount should not be remained.

According to this embodiment, as shown in FIG. 6, a vent path 87 is formed in the plug 24. The vent path 87 is formed in a flange 24c of the plug 24, and passed through a second inner wall 24db of the second hole 24d of the plug 24 and a portion of the plug 24 that faces the outside air W. The vent path 87 is extended in the radial direction with respect to the axis P7 of the plug 24. That is, one end 87e of the vent path 87 is communicated with the second hole 24d of the plug 24. The other end 87f of the vent path 87 is communicated with the outside air W. As a result, flammable gas leaked into the gas residual section 28 is discharged to the outside air W from the vent path 87f, so that safety can be improved.

According to this embodiment, as shown in FIG. 6, a resistance member 9 is disposed on the other end 87f (outlet port of the vent path 87) of the vent path 87 so as to face the outside air W. The resistance member 9 (Gore-Tex®) is formed with a water repellent membrane, and has impenetrability to water molecule, which is big in molecule size, and has penetrability to gas (hydrogen gas), which is small in molecule size. The flammable gas remained in the gas residual section 28 is favorably discharged to the outside air W through the second hole 24d of the plug 24, the vent path 87, and the resistance member 9. However, water such as rainwater existing in the outside air W is prevented from entering through the resistance member 9 into the vent path 87. Accordingly, water is prevented from closing the vent path 87. Especially, the other end 87f of the vent path 87 is formed to open to a downwardly oriented surface 24w of the plug 24. Thus, water such as rainwater existing in the outside air W is effectively prevented from entering through the resistance member 9 into the vent path 87. The resistance member 9 may only be disposed as necessary. In some cases, the resistance member 9 need not be provided. The number of the vent path 87 is supposed to be one in this embodiment. However, the vent path 87 may be disposed in the plurality of numbers. In this embodiment, as shown in FIG. 6, the other end 87f of the vent path 87 is formed to be opened to the downwardly oriented surface 24w of the plug 24. However, the other end 87f of the vent path 87 may be formed to be opened to an upwardly oriented surface 24u of the plug 24.

Figure 7:
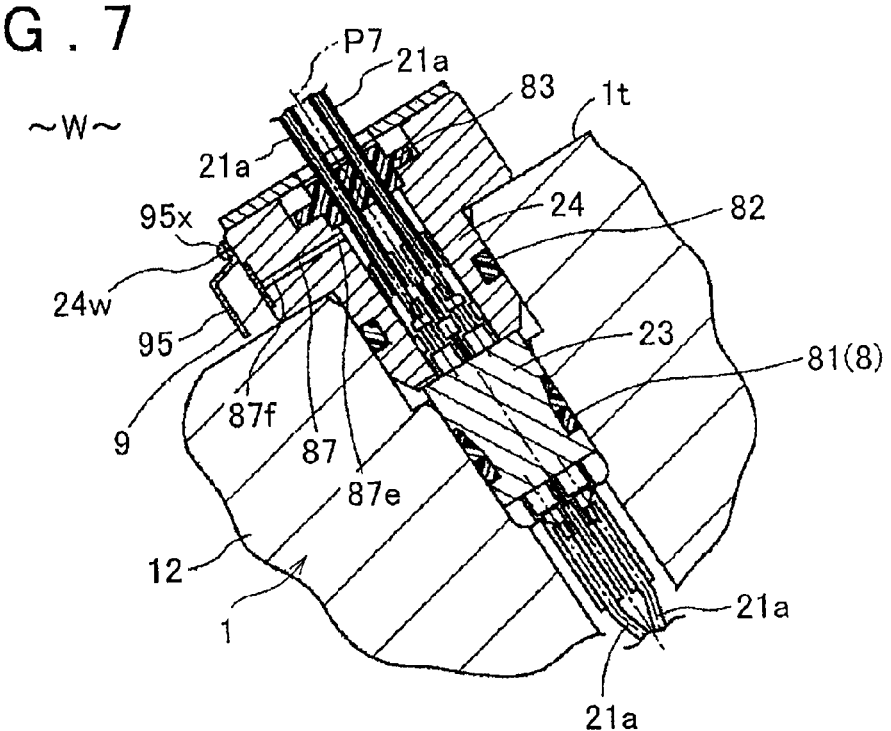
FIG. 7 is a sectional view of the state where the wire holding section is arranged with the wire in the first hole of the fixing member according to a second embodiment.

(Second Embodiment) FIG. 7 illustrates a second embodiment. This embodiment basically possesses the same configuration and effects as the first embodiment. Thus, a description is now made with its focus on the differences. As shown in FIG. 7, the other end 87f of the vent path 87 is formed in the downwardly oriented surface 24w of the plug 24. Furthermore, in order to prevent water such as rainwater existing in the outside air W from directly contacting the resistance member 9, a protective cover 95 as a protective member that protects the resistance member 9 is fixed to the plug 24 with a fastener 95x. Since the direct contact of water such as rainwater to the resistance member 9 is avoided, a longer operating life of the resistance member 9 can be achieved.

Figure 8:
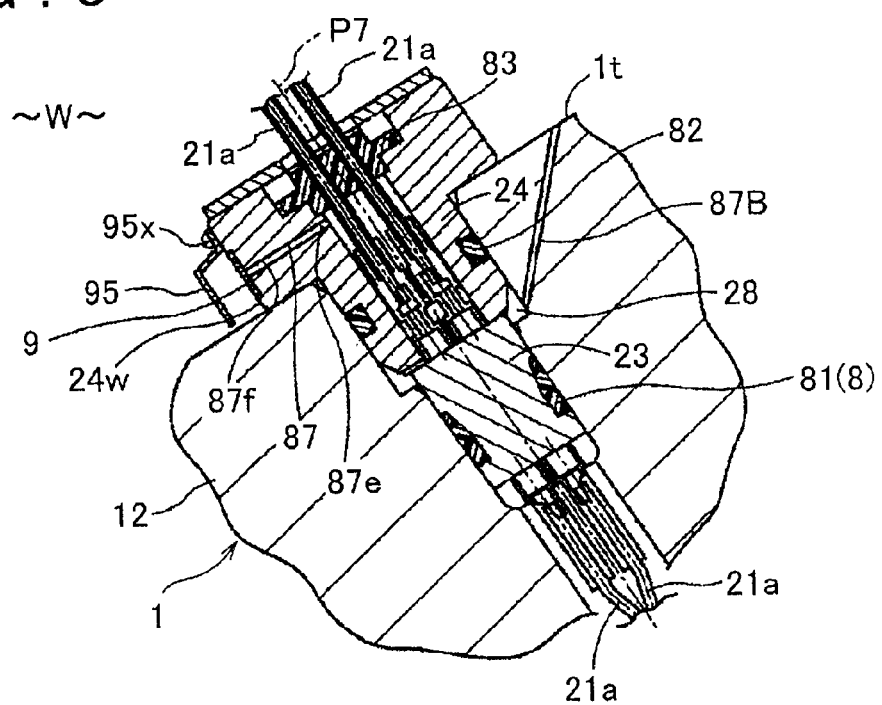
FIG. 8 is a sectional view of the state where the wire holding section is arranged with the wire in the first hole of the fixing member according to a third embodiment.

(Third Embodiment) FIG. 8 illustrates a third embodiment. This embodiment basically possesses the same configuration and effects as the second embodiment. Thus, a description is now made with its focus on the differences. As shown in FIG. 8, in addition to the vent path 87, a second vent path 87B is formed in the fixing member 1. The second vent path 87B communicates the gas residual section 28 with the outside air W. In this way, even when one of the vent path 87 and the second vent path 87B is clogged by a foreign matter (including water), the ventilation can be performed by the other path.

Figure 9:
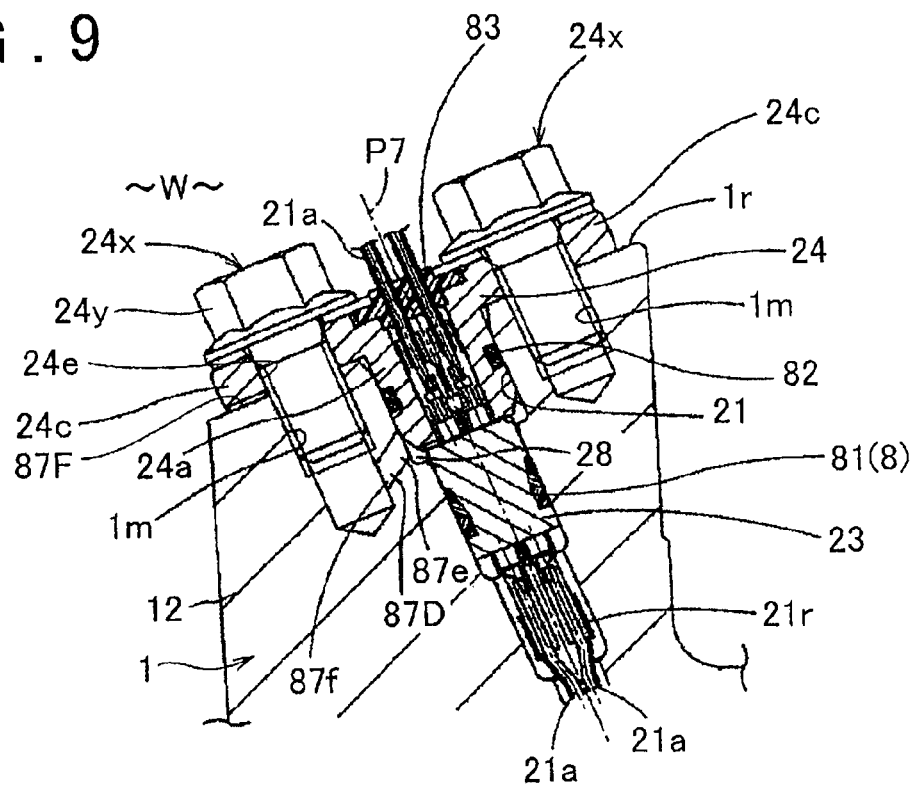
FIG. 9 is a sectional view of the state where the wire holding section is arranged with the wire in the first hole of the fixing member according to a fourth embodiment.

(Fourth Embodiment) FIG. 9 illustrates a fourth embodiment. This embodiment basically possesses the same configuration and effects as the second embodiment. Thus, a description is now made with its focus on the differences. As shown in FIG. 9, the end surface 1r of the fixing member 1 is provided with a plurality of internal thread holes 1m that are opened to the end surface 1r. An external thread of each of plural fastening bolts 24x is inserted in an insertion hole 24e formed in the flange 24c of the plug 24, and then screwed into the internal thread of the respective internal thread holes 1m. Accordingly, the plug 24 (wire holding section) is removably fixed to the fixing member 1 while inserted in the first hole 21. The one end 87e of the vent path 87D is communicated with the gas residual section 28. The other end 87f of the vent path 87D is communicated with the internal thread hole 1m. Micro clearance is formed between the external thread of the fastening bolt 24 and the internal thread of the respective internal thread hole 1. Clearance 87F is formed between the flange 24c and the end surface 1r of the fixing member 1 from the fastening bolt 24x to an end portion of the flange 24c. As a result, the flammable gas leaked and remained in the gas residual section 28 is passed through the vent path 87D, the internal thread hole 1m, and the clearance 87F, and discharged to the outside air W. As shown in FIG. 9, the internal thread hole 1m is closed by the flange 24c of the plug 24. Furthermore, the internal thread hole 1m is closed by the tightening bolt 24x that is screwed into the internal thread hole 1m. A bolt head 24y of the tightening bolt 24x covers the insertion hole 24e formed in the flange 24c. Accordingly, water such as rainwater is prevented from entering through the vent path 87D into the first hole 21. Incidentally, the external thread of the tightening bolt 24x may be sealed with tape as necessary in order to prevent the entry of water and the like.

Figure 10:
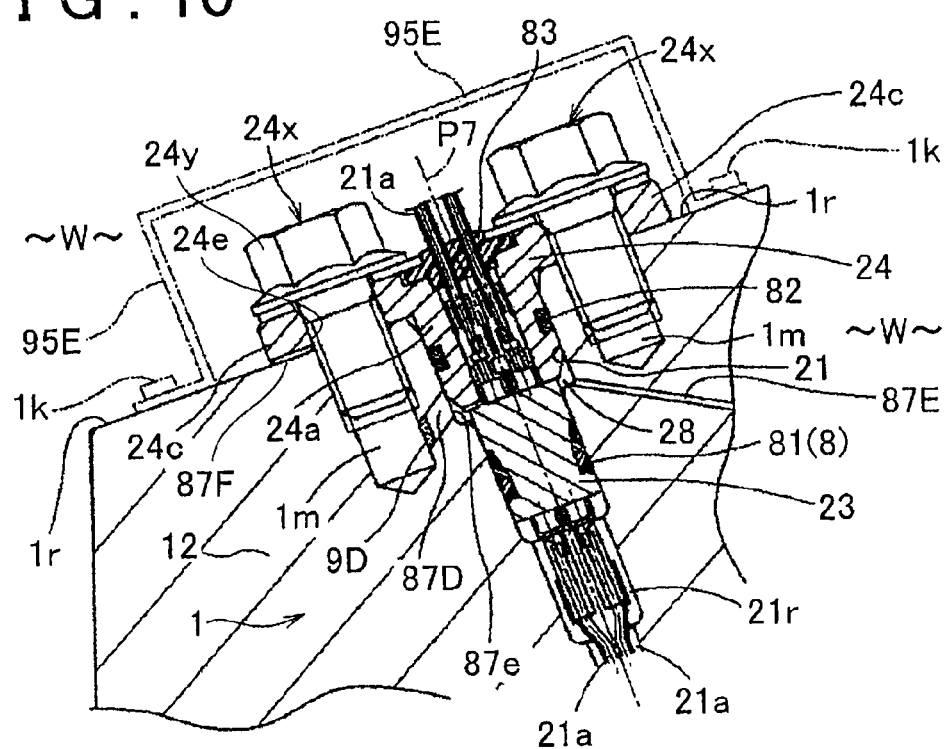
FIG. 10 is a sectional view of the state where the wire holding section is arranged with the wire in the first hole of the fixing member according to a fifth embodiment.

(Fifth Embodiment) FIG. 10 illustrates a fifth embodiment. This embodiment basically possesses the same configuration and effects as the fourth embodiment. Thus, a description is now made with its focus on the differences. As shown in FIG. 10, in addition to the vent path 87D, a second vent path 87E is formed in the fixing member 1 in a penetrating manner. The second vent path 87E communicates the gas residual section 28 with the outside air W. Accordingly, even when one of the vent path 87D and the second vent path 87E is clogged by a foreign matter (including water), the ventilation can still be performed by the other path. A resistance member 9D is provided in the vent path 87D. A resistance member may also be provided in the second vent path 87E. A waterproof protective cover 95E that covers the bolt head of the tightening bolt 24x is removably fixed to the end surface 1r of the fixing member 1 with a fixing member 1k. Since the inside of the protective cover 95E is maintained at atmospheric pressure, discharging ability of gas is maintained.

(Other Embodiment) In the above-mentioned embodiments, the tank 3 stores the high-pressure hydrogen gas. However, the gas may be hydrocarbon gas such as methane gas that can be the fuel for reformulation of the fuel cell. The gas may be purge gas such as argon gas and nitrogen gas used for purge process of the fuel cell and reformer, or may be another high pressure gas such as oxygen gas that functions as cathode gas. The gas may be corrosive gas. The number of the wire 21a is plural in the above embodiments; however, the wire 21a may be provided singular. The third sealing section 83 may solely be used for a waterproof sealing section. Depending on circumstances, the first sealing section 81 and the second sealing section 82 may not be provided. Although L1 is set within 2.5×D in the above embodiments, it is not limited to this range. Each of the above-mentioned embodiments is applied to the fuel cell system; however, the application of the embodiments is not limited thereto. The above-mentioned embodiments are also applicable to other systems. The present invention is not limited to each of the embodiments described above; however, suitable modifications may be employed within the scope of the intention of the present invention.

The present invention can be used for the fuel cell system. Such fuel cell system can be for a vehicle, stationary equipment, industry, and electrical equipment.

What is claimed is:
1. A component holding device comprising:
a fixing member that includes a first inner wall surface that forms a first hole into which gas enters and a component is inserted;
a component holding section that is fit to the first hole of the fixing member and that holds the component;

a sealing section that is disposed in the first hole and that seals the component holding section to prevent water from entering into the first hole of the fixing member; and a vent path that is provided in the component holding section so as to communicate with a gas residual section in the first hole and that discharges leaked gas in the gas residual section to outside air.

2. The component holding device according to claim 1, further comprising a resistance member that inhibits water transmission and that permits gas transmission, wherein the resistance member is disposed in the vent path.

3. The component holding device according to claim 1, wherein the component holding section includes a second inner wall surface that forms a second hole to which the component is inserted.

4. The component holding device according to claim 3, wherein the vent path penetrates the fixing member so as to communicate between the first inner wall surface of the first hole and a portion of the fixing member that is in contact with outside air.

5. The component holding device according to claim 1, wherein the fixing member includes an internal thread hole into which an external thread is screwed, and the vent path is communicated with the internal thread hole.

6. The component holding device according to claim 2, further comprising a protective cover that protects the resistance member, wherein the protective cover is provided in at least one of the component holding section and the fixing member.

7. The component holding device according to claim 1, wherein the component is a wire, and the component holding section holds the wire.

8. The component holding device according to claim 1, wherein the fixing member is mounted to a tank that stores flammable or corrosive gas in a high pressure state.

9. The component holding device according to claim 1, wherein the component holding section includes a flange section that contacts an outer surface of the fixing member and contacts the outside air, and wherein the vent path extends radially through the flange section from a central axis of the component holding section.

10. The component holding device according to claim 3, further comprising:

a second vent path that penetrates the component holding member so as to communicate between the second inner wall surface of the second hole and a portion of the component holding member that is in contact with outside air.

11. The component holding device according to claim 3, further comprising:

a second sealing section disposed in the second hole and that seals the component, wherein the gas residual section is between the sealing section and the second sealing section.

12. A component holding device comprising:

a fixing member that includes a first inner wall surface that forms a first hole into which gas enters and a component is inserted;

a component holding section that is fit to the first hole of the fixing member and that holds the component;

a sealing section that is disposed in the first hole and that seals the component holding section to prevent water from entering into the first hole of the fixing member;

a vent path that is provided in at least one of the fixing member and the component holding section so as to communicate with a gas residual section in the first hole and that discharges leaked gas in the gas residual section to the outside air; and a fastening bolt on which an external thread is formed, wherein the fixing member includes an internal thread hole, wherein the component holding section is fixed to the fixing member by screwing and fastening the external thread of the fastening bolt into the internal thread hole, and wherein the vent path is communicated with the internal thread hole.

13. The component holding device according to claim 12, wherein in a state where the external thread is screwed into the internal thread hole, clearance through which the gas is passed is formed between the external thread and the internal thread hole.

14. The component holding device according to claim 12, wherein a flange is formed in the component holding section, and the flange covers the internal thread hole in a state where the component holding section and the fixing member are fastened.

15. The component holding device according to claim 14, wherein in a state where the external thread is screwed into the internal thread hole, clearance through which gas is passed is formed between the flange and the fixing member and which extends from the fastening bolt to an end portion of the flange.

16. A component holding device comprising:

a fixing member that includes a first inner wall surface that forms a first hole into which gas enters and a component is inserted;

a component holding section that is fit to the first hole of the fixing member and that holds the component;

a sealing section that is disposed in the first hole and that seals the component holding section to prevent water from entering into the first hole of the fixing member; and a vent path that is provided in at least one of the fixing member and the component holding section so as to communicate with a gas residual section in the first hole and that discharges leaked gas in the gas residual section to the outside air, wherein the component holding section includes: a first component holding section that is fit to the first hole and that holds the component; and a second component holding section that is fit to the first hole and that holds the component, wherein the first component holding section is provided between the second component holding section and a source of an intruding gas, and wherein the vent path is provided in at least one of the first component holding section and the second component holding section.

17. The component holding device according to claim 16, wherein the sealing section includes: a first sealing section that seals between the first component holding section and the fixing member; and a second sealing section that seals between the second component holding section and the fixing member; and the gas residual section is formed between the first sealing section and the second sealing section.

* * * * *